US008616695B2

(12) United States Patent
Mori et al.

(10) Patent No.: US 8,616,695 B2
(45) Date of Patent: Dec. 31, 2013

(54) INK, INK CARTRIDGE, AND INK JET RECORDING METHOD

(75) Inventors: Yasuhito Mori, Kawasaki (JP); Shinichi Hakamada, Kawasaki (JP); Tomohiro Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/442,279

(22) Filed: Apr. 9, 2012

(65) Prior Publication Data

US 2012/0268532 A1 Oct. 25, 2012

(30) Foreign Application Priority Data

Apr. 19, 2011 (JP) ................................ 2011-093359
Mar. 30, 2012 (JP) ................................ 2012-079591

(51) Int. Cl.
*G01D 11/00* (2006.01)

(52) U.S. Cl.
USPC .......................................................... 347/100

(58) Field of Classification Search
None
See application file for complete search history.

(56) References Cited

U.S. PATENT DOCUMENTS 5,782,967 A 7/1998 Shirota et al.
6,036,307 A 3/2000 Hakamada et al.
6,214,963 B1 4/2001 Noguchi et al.
6,398,355 B1 6/2002 Shirota et al.
6,474,803 B1 11/2002 Shirota et al.
6,552,156 B2 4/2003 Noguchi et al.
6,676,254 B2 1/2004 Nagashima et al.
6,698,876 B2 3/2004 Sato et al.
6,723,137 B1 4/2004 Hakamada et al.
6,929,362 B2 8/2005 Takada et al.
6,932,465 B2 8/2005 Nito et al.
6,935,732 B2 8/2005 Takada et al.
7,141,105 B2 11/2006 Udagawa et al.
7,144,449 B2 12/2006 Udagawa et al.
7,160,372 B2 1/2007 Yoshizawa et al.
7,185,978 B2 3/2007 Nagashima et al.
7,195,340 B2 3/2007 Nagashima et al.
7,208,032 B2 4/2007 Hakamada et al.
7,226,498 B2 6/2007 Yamashita et al.
7,247,194 B2 7/2007 Okamura et al.
7,270,701 B2 9/2007 Jinnou et al.
7,276,112 B2 10/2007 Tokuda et al.
7,291,214 B2 11/2007 Tsuji et al.
7,297,197 B2 11/2007 Jinnou et al.
7,297,203 B2 11/2007 Takada et al.
7,354,145 B2 4/2008 Nito et al.
7,377,631 B2 5/2008 Takada et al.
7,381,257 B2 6/2008 Takayama et al.
7,402,200 B2 7/2008 Imai et al.
7,429,291 B2 9/2008 Udagawa et al.
7,464,965 B2 12/2008 Udagawa et al.
7,517,073 B2 4/2009 Nito et al.
7,517,074 B2 4/2009 Hakamada et al.
7,537,329 B2 5/2009 Nito et al.
7,550,037 B2 6/2009 Mafune et al.
7,578,876 B2 8/2009 Nakajima et al.
7,601,210 B2 10/2009 Fujioka et al.
7,611,571 B2 11/2009 Yamashita et al.
7,635,182 B2 12/2009 Hakamada et al.
7,695,554 B2 4/2010 Matsumoto et al.
7,705,071 B2 4/2010 Nakagawa et al.
7,740,697 B2 6/2010 Nagashima et al.
7,806,970 B2 10/2010 Fujioka et al.
7,854,798 B2 12/2010 Udagawa et al.
7,883,199 B2 2/2011 Hakamada et al.
7,909,448 B2 3/2011 Iwata et al.
7,918,928 B2 4/2011 Saito et al.
7,947,762 B2 5/2011 Udagawa et al.
8,013,051 B2 9/2011 Takada et al.
8,016,406 B2 9/2011 Hakamada et al.
8,075,126 B2 12/2011 Yoshizawa et al.
8,217,097 B2 7/2012 Udagawa et al.
2007/0097155 A1 5/2007 Imai et al.
2007/0112095 A1 5/2007 Moribe et al.
2008/0152827 A1 6/2008 Hakamada et al.
2009/0078889 A1 3/2009 Udagawa et al.
2009/0258145 A1 10/2009 Mukae et al.
2011/0141190 A1 6/2011 Moribe et al.
2012/0268521 A1 10/2012 Moribe et al.

FOREIGN PATENT DOCUMENTS

JP 2006-199744 A 8/2006
JP 2006-225638 A 8/2006

*Primary Examiner* — Matthew Luu
*Assistant Examiner* — Renee I Wilson
(74) *Attorney, Agent, or Firm* — Fitzpatrick, Cella, Harper & Scinto

(57) ABSTRACT

Provided is an ink jet ink including a monoazo pigment and a resin, the ink being used for an ink jet recording system in which the ink is ejected from a recording head by an action of thermal energy. The monoazo pigment is a self-dispersible pigment having an anionic group bonded to a particle surface of the pigment directly or via another atomic group and has a surface charge amount of $5.9\times10^{-2}$ mmol/g or more and $9.8\times10^{-2}$ mmol/g or less. The resin has an acid value of 100 mg KOH/g or more and 160 mg KOH/g or less. The mass ratio of the content (mass %) of the resin to the content (mass %) of the monoazo pigment in the ink is 0.05 times or more and 0.25 times or less.

7 Claims, No Drawings

INK, INK CARTRIDGE, AND INK JET RECORDING METHOD

BACKGROUND OF THE INVENTION

1. Field of the Invention

The present invention relates to an ink jet ink, and an ink cartridge and an ink jet recording method using the ink.

2. Description of the Related Art

In an ink jet recording method, recording can be performed on various recording media. In addition, in order to realize more satisfactory image recording, for example, there are proposals concerning various inks depending on purposes, such as an ink suitable for recording an image with photographic image quality on glossy paper or the like and an ink suitable for recording a document on plain paper or the like. In recent years, the ink jet recording method has been utilized also in printing of, for example, a business document including a letter, a diagram, and the like using plain paper or the like as a recording medium, and an increase in utilization frequency thereof for such application is remarkable. Therefore, as for an ink suitable for recording a letter or a diagram on a recording medium such as plain paper, a pigment has more frequently been used as a coloring material for a color ink as well as a black ink.

Under such circumstances, various studies have been made on a monoazo pigment among organic pigments to be used for ink jet color inks because it has strong coloring power, provides an image excellent in color developability, and is also advantageous in terms of cost. In general, however, the monoazo pigment is particularly weak against heat as compared to other organic pigments. Hence, when the monoazo pigment is applied to an ink jet system in which an ink is ejected from a recording head by an action of thermal energy, ejection characteristics are liable to lower. For example, it is known that when C.I. Pigment Yellow 74 as a representative monoazo pigment is used, a pigment aggregate deposits in an ink flow path of a recording head, resulting in a reduction in ejection characteristics.

In order to deal with such problem, there is a proposal concerning an ink containing a monoazo pigment dispersed with a resin dispersant or a monoazo pigment capable of being dispersed in an ink without using any resin dispersant, and a substance for inhibiting aggregation of the pigment (see Japanese Patent Application Laid-Open No. 2006-225638 and Japanese Patent Application Laid-Open No. 2006-199744). According to the inventions described in Japanese Patent Application Laid-Open No. 2006-225638 and Japanese Patent Application Laid-Open No. 2006-199744, it is considered that reductions in ejection stability and storage stability of an ink are suppressed by enhancing the dispersibility of an aggregate even in an ink jet system utilizing thermal energy.

SUMMARY OF THE INVENTION

Under the above-mentioned circumstances, the inventors of the present invention made various studies on the structure of an ink containing a self-dispersible monoazo pigment in order to provide an image excellent in color developability in the case of using plain paper or the like as a recording medium. As a result, the inventors concluded that it was difficult to simultaneously achieve both of excellent color developability of a self-dispersible monoazo pigment and a high level of ejection stability thereof in an ink jet ejection system utilizing thermal energy in the case of adopting the conventional technology as mentioned above.

Thus, an object of the present invention is to provide an ink containing a self-dispersible monoazo pigment capable of satisfying ejection stability when being ejected from a recording head of an ink jet system by an action of thermal energy and improving color developability of an image. Further, another object of the present invention is to provide an ink cartridge and an ink jet recording method capable of stably recording an image having high color developability through the use of the excellent ink.

The objects can be achieved by the present invention to be described below. That is, an ink of the present invention is an ink jet ink, being used for an ink jet recording system in which the ink is ejected from a recording head by an action of thermal energy, including a monoazo pigment and a resin, wherein the monoazo pigment contains a self-dispersible pigment having an anionic group bonded to a particle surface of the pigment directly or via another atomic group and has a surface charge amount of $5.9\times10^{-2}$ mmol/g or more and $9.8\times10^{-2}$ mmol/g or less; the resin has an acid value of 100 mg KOH/g or more and 160 mg KOH/g or less; and a mass ratio of a content (mass %) of the resin to a content (mass %) of the monoazo pigment in the ink is 0.05 times or more and 0.25 times or less.

According to the present invention, it is possible to provide the ink containing a self-dispersible monoazo pigment to be ejected from a recording head of an ink jet system by an action of thermal energy, the ink being capable of achieving a high level of ejection stability and improving color developability of an image. Further, according to another embodiment of the present invention, it is possible to provide the ink cartridge and the ink jet recording method capable of stably recording an image having high color developability through the use of the ink.

Further features of the present invention will become apparent from the following description of exemplary embodiments.

DESCRIPTION OF THE EMBODIMENTS

Hereinafter, the present invention is described in detail by way of preferred embodiments. It should be noted that any of various physical properties such as a surface tension in the present invention is a value at 25° C. Further, a monoazo pigment is sometimes simply referred to as "pigment."

First, how the present invention has been completed is described. The inventors of the present invention prepared the following two kinds of inks and made studies on the inks. The first ink is an ink containing a monoazo pigment dispersed with a resin dispersant (hereinafter, sometimes referred to as "resin-dispersed pigment"). Further, the second ink is an ink containing a monoazo pigment dispersed by an action of an anionic group bonded to the surface of a pigment particle directly or via another atomic group (hereinafter, sometimes referred to as "self-dispersible pigment"). In addition, each of those two kinds of inks thus prepared was used for an ink jet recording system in which the ink was ejected from a recording head by an action of thermal energy, to thereby evaluate the ejection stability of the ink. The results revealed that the self-dispersible pigment gave a smaller amount of an aggregate generated in an ink flow path of the recording head and was more satisfactory in ejection stability than the resin-dispersed pigment.

The inventors of the present invention have supposed that such difference occurs for the following reason. In the case of the ink containing the resin-dispersed pigment, the thermal decomposition of the monoazo pigment or the like makes the dispersion state of the pigment unstable. Thus, the aggregation of the pigment occurs. In addition, the generated aggregate does not undergo any sufficient action of a resin dispersant, which should intrinsically contribute to the dispersion, and hence is estimated to deposit in the ink flow path without being dispersed. On the other hand, in the case of the ink containing the self-dispersible pigment, even when the monoazo pigment is thermally decomposed, an anionic group stable against heat is present in the surface of the aggregate, and hence the dispersibility of the aggregate is maintained to some extent. As a result, it is considered that the redispersibility of the aggregate is satisfactory and the ejection stability is relatively high in the case of using the self-dispersible pigment as compared to the case of using the resin-dispersed pigment.

However, as compared to carbon black conventionally widely used as the self-dispersible pigment, an organic pigment such as the monoazo pigment is difficult to increase the amount of an anionic group to be bonded to the surface thereof, when the pigment is made self-dispersible. Thus, it was found that, in the case of using the monoazo pigment weak against heat, the generation of an aggregate hardly occurred as compared to the resin-dispersed pigment, but even in the case of using the self-dispersible pigment, the generation of the aggregate was not able to be suppressed to such an extent as to achieve a high level of ejection stability.

In view of the foregoing, in order to achieve the objects, the inventors of the present invention prepared an ink containing a self-dispersible monoazo pigment in which a substance for suppressing aggregation described in each of Japanese Patent Application Laid-Open No. 2006-225638 and Japanese Patent Application Laid-Open No. 2006-199744 above was added, and evaluated the ejection stability of the ink. As a result, it was found that the generation of an aggregate was suppressed by increasing the content of the substance, and the ejection stability of the ink was improved. However, it was also found that, when the content of the substance was set to such an amount that the generation of an aggregate was able to be suppressed, the surface tension of the ink was reduced (approximately less than 36 mN/m) and the color developability of an image was reduced. It was also found that some of substances each selected as the substance for suppressing aggregation also suppressed the aggregation of the pigment after the ink had been applied onto a recording medium, which was another cause for a reduction in the color developability of an image.

In view of the foregoing, the inventors of the present invention made studies in order to find conditions necessary for an ink satisfying ejection stability from a recording head utilizing thermal energy without impairing the color developability of the self-dispersible monoazo pigment. As a result, the inventors found that the objects were able to be achieved by an ink satisfying the following first and second conditions. Thus, the present invention has been completed. That is, the first condition is to use, as the monoazo pigment and the resin each constituting the ink, ones satisfying the following requirements. Specifically, a self-dispersible pigment having a surface charge amount of $5.9\times10^{-2}$ mmol/g or more and $9.8\times10^{-2}$ mmol/g or less is used as the monoazo pigment and a resin having an acid value of 100 mg KOH/g or more and 160 mg KOH/g or less is used as the resin. Further, the second condition is to adjust the mass ratio of the content (mass %) of the resin to the content (mass %) of the monoazo pigment in the ink within the range of 0.05 times or more and 0.25 times or less. The inventors of the present invention have supposed the reason why the objects can be achieved by satisfying the surface charge amount of the self-dispersible monoazo pigment constituting the ink, the acid value of the resin to be added, and the mass ratio of the content of the resin to the content of the monoazo pigment, as described below. It should be noted that the resin to be assumed in the following description is a resin having a hydrophilic unit containing a group typified by, for example, an acidic group providing an acid value, and a hydrophobic unit.

First, the inventors of the present invention supposed that the following two actions were exerted in the ink containing the self-dispersible monoazo pigment by further adding the resin to the ink. The first action is an action of enhancing ejection stability through the adsorption of a hydrophobic unit derived from such as styrene constituting the resin to an area on the surface of a pigment particle, i.e., a portion to which an anionic group or the like is not bonded. The second action is an action of improving color developability through the promotion of the aggregation of the pigment due to a sharp increase in electrolyte concentration based on the presence of the resin having an acidic group when the ink is applied onto a recording medium and then the evaporation of a liquid component such as water occurs.

In view of the foregoing, the inventors of the present invention made the following studies based on the supposition. In the studies, first, an ink 1 containing a self-dispersible monoazo pigment having a relatively low surface charge amount, a water-soluble organic solvent, a surfactant, and water, and an ink 2 obtained by adding a resin having a low acid value to the ink 1 were prepared. In addition, an ink 3 containing a self-dispersible monoazo pigment having a relatively high surface charge amount, a water-soluble organic solvent, a surfactant, water, and a resin having a high acid value was prepared. Next, each of the inks thus prepared was used to record an image. As a result, the ink 3 was most excellent in the color developability of the image, followed by the ink 2 and the ink 1 in this order. Next, each of those inks was mounted on an ink jet recording apparatus in which the ink was ejected by an action of thermal energy (trade name: PIXUS Pro 9500; manufactured by Canon Inc.), and solid images measuring 19 cm by 26 cm were recorded on 300 sheets of A4-sized recording media. Then, after the recording on the 300th sheet, a recording head was taken out from the ink jet recording apparatus and an ink flow path was observed with a light microscope.

As a result, the ink 2 was able to be normally ejected and did not involve any problem in the ink flow path. In contrast, the inks 1 and 3 each had lowered ejection stability and generated an aggregate of a pigment in the ink flow path. Thus, the inventors of the present invention further measured the concentration of metal ions and the amount of the resin adsorbed to the surface of a pigment particle in each of the ink 2 and the ink 3. As a result, the concentration of metal ions in the ink was relatively high in the ink 3, and the amount of the resin adsorbed to the surface of a pigment particle was relatively high in the ink 2.

The inventors of the present invention have supposed the reason why the concentration of metal ions in the ink and the amount of the resin adsorbed to the surface of a pigment particle affected the color developability of the image and the ejection stability of the ink, as described below. In order to dissolve the resin in the ink, an acidic group in the resin is neutralized with a neutralizer such as an alkali metal hydroxide. In an ink containing a resin having a high acid value, such as the ink 3, the neutralizer increases the concentration of an electrolyte in the ink, and hence the color developability of the image is improved by the above-mentioned action. However, the resin contains a hydrophobic unit in a relatively small amount because of a higher acid value, with the result that the adsorption of the resin to the surface of a pigment particle hardly occurs. Thus, an action of suppressing aggregation and an action of sufficiently dispersing the generated aggregate by keeping the dispersion state of a pigment stably are not exhibited. It has been supposed that this results in the deposition of an aggregate in the ink flow path.

Meanwhile, also in the case of an ink containing a resin having a low acid value, such as the ink 2, though not comparable to the case of the ink containing a resin having a high acid value, the concentration of an electrolyte in the ink is increased as compared to the case of an ink free of any resin, and hence the color developability of the image is slightly improved. However, unlike the ink containing a resin having a high acid value, the resin having a low acid value contains a hydrophobic unit in a relatively large amount, and hence the adsorption of the resin to the surface of a pigment particle easily occurs. By virtue of the resin thus adsorbed, an action of suppressing aggregation and an action of sufficiently dispersing the generated aggregate by keeping the dispersion state of a pigment stable are easily exhibited. It has been supposed that this allows the deposition of an aggregate to be suppressed.

The inventors of the present invention made more detailed studies on the first condition (the surface charge amount of the monoazo pigment and the acid value of the resin) described above, and obtained the following findings. First, in the present invention, the surface charge amount representing the amount of an anionic group per g of the pigment is adopted as an indicator of the amount of an anionic group bonded directly or via another atomic group to the surface of a pigment particle. A method of measuring a value for the quantity is described later. In addition, as the surface charge amount of the monoazo pigment becomes lower, the breadth of the area on the surface of a pigment particle becomes larger, and the amount of the resin adsorbed to the surface of a pigment particle increases. Hence, an action of suppressing aggregation and an action of sufficiently dispersing the generated aggregate by keeping the dispersion state of a pigment stable are easily exhibited. However, when the surface charge amount of the monoazo pigment becomes too low, the redispersibility of an aggregate with an anionic group possessed by the pigment lowers. Hence, even when the amount of the resin adsorbed to the surface of a pigment particle increases, the deposition of an aggregate cannot be suppressed. For such reason, the surface charge amount of the monoazo pigment needs to be $5.9\times10^{-2}$ mmol/g or more. On the other hand, when the surface charge amount of the monoazo pigment becomes too high, the breadth of area on the surface of a pigment particle decreases. As a result, even when a resin having a low acid value is added, the adsorption of the resin to the surface of a pigment particle becomes unlikely to occur. Therefore, an action of sufficiently dispersing the generated aggregate is not exhibited, and the deposition of the aggregate cannot be suppressed. For such reason, the surface charge amount of the monoazo pigment needs to be $9.8\times10^{-2}$ mmol/g or less.

The degree of an influence by each of the actions also depends on the acid value of a resin to be added. First, there is a tendency that, as the acid value of the resin becomes lower, the amount of the resin adsorbed to the surface of a pigment particle becomes larger. However, as the acid value becomes lower, the hydrophobicity of the resin becomes higher. Hence, when the acid value of the resin is too low, the resin easily aggregates in an ink rather than being adsorbed to the surface of a pigment particle, with the result that the resin becomes unlikely to be adsorbed to the surface of a pigment particle. For such reason, the acid value of the resin needs to be 100 mg KOH/g or more. On the other hand, as the acid value becomes higher, the hydrophilicity of the resin becomes higher. Hence, when the acid value of the resin is too high, the resin becomes likely to be present as a free form in the ink rather than being adsorbed to the surface of a pigment particle, and the amount of the resin adsorbed to the surface of a pigment particle becomes smaller. For such reason, the acid value of the resin needs to be 160 mg KOH/g or less. That is, the deposition of an aggregate cannot be effectively suppressed by adding any of a resin having an acid value of less than 100 mg KOH/g and a resin having an acid value of more than 160 mg KOH/g.

In addition, the degree of the influence by each of the actions also depends on a proportion between the monoazo pigment and the resin in the ink (second condition described above). That is, when the content of the resin in the ink becomes larger with respect to the content of the monoazo pigment, the concentration of an electrolyte in the ink increases, which is advantageous for improving the color developability of an image. On the other hand, in this case, the amount of the resin adsorbed to the surface of a pigment particle increases, and hence the dispersion state of a pigment becomes likely to be kept more stable, which is advantageous for suppressing the deposition of an aggregate. In actuality, however, the latter action becomes predominant, and the dispersibility stability of the pigment becomes too high. Hence, the aggregation of the pigment due to an increase in electrolyte concentration during the application of the ink onto a recording medium is also hardly promoted, and the color developability of an image lowers. For such reason, the mass ratio of the content of the resin to the content of the monoazo pigment in the ink needs to be 0.25 times or less. On the other hand, when the content of the resin in the ink becomes small with respect to the content of the monoazo pigment, the amount of the resin adsorbed to the surface of a pigment particle also becomes small, and the amount of the resin necessary for sufficiently dispersing an aggregate is not obtained. Therefore, the deposition of the aggregate is not suppressed, and the ejection stability of the ink lowers. For such reason, the mass ratio of the content of the resin to the content of the monoazo pigment in the ink needs to be 0.05 times or more.

In the inventions described in Japanese Patent Application Laid-Open No. 2006-225638 and Japanese Patent Application Laid-Open No. 2006-199744 mentioned above, the dispersibility of an aggregate of a pigment is enhanced with a substance for suppressing aggregation to suppress the deposition of the aggregate. On the other hand, in the present invention, a monoazo pigment having an appropriate surface charge amount and a resin having an appropriate acid value are incorporated into an ink at a very limited mass ratio, thereby suppressing the aggregation of the pigment itself as well as enhancing the dispersibility of an aggregate. The synergistic action thereof suppresses the deposition of an aggregate. Thus, a high level of ejection property can be satisfied.

<Ink>

Hereinafter, components for constituting the ink of the present invention are described.

Pigment

A coloring material for constituting the ink of the present invention is a self-dispersible monoazo pigment having an anionic group bonded to a particle surface directly or via another atomic group. The particle surface of the monoazo pigment is bonded to a functional group (an anionic group when the anionic group is bonded directly and another atomic group and an anionic group when the anionic group is bonded via the another atomic group) with a covalent bond.

The kind of the monoazo pigment usable in the present invention is not particularly limited, and any known pigment may be used. Specific examples thereof include C.I. Pigment Yellow: 1, 2, 3, 5, 6, 49, 65, 73, 74, 75, 97, 98, 111, 116, 130, 61, 62:1, 133, 168, 169, C.I. Pigment Orange: 1, and C.I. Pigment Red 269. Further, in the present invention, it is preferred to use at least one pigment selected from C.I. Pigment Yellow 1, C.I. Pigment Yellow 74, and C.I. Pigment Red 269 because the use thereof provides higher color developability of an image. In addition, of those pigments, it is particularly preferred to use C.I. Pigment Yellow 74.

The content (mass %) of the monoazo pigment in the ink is preferably 2.5 mass % or more and 10.0 mass % or less, more preferably 4.0 mass % or more and 6.0 mass % or less with respect to the total mass of the ink.

The surface charge amount of the monoazo pigment to be used in the ink of the present invention needs to be $5.9\times10^{-2}$ mmol/g or more and $9.8\times10^{-2}$ mmol/g or less. That is, it is necessary that an anionic group be chemically bonded to the surface of a pigment particle directly or via another atomic group, and the amount of the anionic group per unit mass represented by a surface charge amount be $5.9\times10^{-2}$ mmol/g or more and $9.8\times10^{-2}$ mmol/g or less. A resin having an acid value of 100 mg KOH/g or more and 160 mg KOH/g or less is incorporated into the ink of the present invention as described later. In the present invention, however, this resin is expected to exhibit an action of assisting the dispersion of a self-dispersible monoazo pigment and an aggregate thereof, and the action of the resin alone is not expected to disperse the pigment. That is, the term "self-dispersible" as used herein means that, when a high molecular weight compound such as a resin, a compound having a surface active capacity, or the like is physically adsorbed to the surface of a pigment particle, a pigment is not dispersed by only the dispersing action of each of those compounds in principle. That is, unlike the so-called resin-dispersed pigment, in which the dispersibility of a pigment is achieved only by adsorbing a resin dispersant to the surface of a pigment particle, the self-dispersible monoazo pigment to be used in the present invention can be dispersed without using the specific resin.

In the present invention, the surface charge amount of the monoazo pigment is determined by colloidal titration. This method has advantages in that it is simpler than a conventional method involving determining the amount of an anionic group by quantification of a counter ion of the anionic group, provides a high accuracy, and can measure the amount of an anionic group directly. In Examples to be described later, the surface charge amount of a pigment in a pigment dispersion liquid was measured by colloidal titration utilizing a potential difference with an automatic potentiometric titrator (AT-510; manufactured by Kyoto Electronics Manufacturing Co., Ltd.) equipped with a streaming potential titration unit (PCD-500). In this case, methyl glycol chitosan was used as a titration reagent. It should be noted that the surface charge amount may also be measured with a pigment extracted from an ink by an appropriate method, as a matter of course.

Examples of the anionic group chemically bonded to the surface of a pigment particle directly or via another atomic group include —COOM, —$SO_3M$, —$PO_3HM$, and —$PO_3M_2$ (M in the formulae represents a hydrogen atom, an alkali metal, an ammonium, or an organic ammonium). In the present invention, the anionic group is preferably a monovalent anionic group, more preferably —COOM or —$SO_3M$. Further, examples of the another atomic group (—R—) include a linear or branched alkylene group having 1 to 12 carbon atoms, an arylene group such as a phenylene group or a naphthylene group, an amide group, a sulfone group, an amino group, a carbonyl group, an ester group, and an ether group. Further examples thereof include groups obtained by combining those groups. Examples of the alkali metal represented by M include Li, Na, and K. When the anionic group forms a salt, the form of the salt in the ink may be any of a partially dissociated form and a wholly dissociated form. In the present invention, the molecular weight of a functional group bonded to the surface of a pigment particle (an anionic group when the anionic group is bonded directly and another atomic group and an anionic group when the anionic group is bonded via the another atomic group) is preferably 1,000 or less.

In the present invention, in addition to the monoazo pigment mentioned above, a self-dispersible monoazo pigment obtained by surface oxidation, which has a surface charge amount of $5.9\times10^{-2}$ mmol/g or more and $9.8\times10^{-2}$ mmol/g or less, may be used. Examples of such monoazo pigment include ones obtained by methods such as an oxidation treatment with sodium hypochlorite, an ozone treatment in water, and an ozone treatment, followed by wet oxidation with an oxidant to modify the surface of a pigment particle. In the present invention, as long as the effects of the present invention are exerted, in addition to the foregoing, pigments according to other dispersion systems (e.g., a resin-dispersed pigment, a microcapsule pigment, and a resin-bonded self-dispersible pigment) may be further used in combination.

Resin

In the ink of the present invention, in addition to the monoazo pigment, a resin having an acid value of 100 mg KOH/g or more and 160 mg KOH/g or less needs to be incorporated. As described above, the resin is used in expectation of an action of assisting the dispersion of the self-dispersible monoazo pigment and the aggregate thereof. The resin to be used in the present invention is preferably water-soluble. In the present invention, the phrase "resin is water-soluble" means that when the resin is neutralized with an alkali equivalent to its acid value, the resin does not have make a particle that has a measurable particle size. A resin satisfying such condition is referred to as "water-soluble resin" in the present invention.

In the present invention, the content (mass %) of the resin having an acid value within the specific range in the ink is preferably 1.0 mass % or more and 3.0 mass % or less, more preferably 1.0 mass % or more and 2.0 mass % or less with respect to the total mass of the ink. In addition, in the present invention, it is necessary to adjust the mass ratio of the content of the resin to the content of the monoazo pigment in the ink to 0.05 times or more and 0.25 times or less. It should be noted that the content of the resin and the content of the monoazo pigment in this case are each a value with respect to the total mass of the ink.

A specific resin to be suitably used in the present invention is preferably a water-soluble resin having at least a hydrophilic unit and a hydrophobic unit as structural units as mentioned below. It should be noted that the term "(meth)acrylic ((meth)acrylate)" in the following description refers to "acrylic (acrylate)" and "methacrylic (methacrylate)."

Examples of a monomer having a hydrophilic group which will become a hydrophilic unit by polymerization include the following: acidic monomers having a carboxy group such as (meth)acrylic acid, itaconic acid, maleic acid, and fumaric acid, acidic monomers having a phosphonic acid group such as ethyl(meth)acrylate-2-phosphonate, anionic monomers such as anhydrides and salts of these acidic monomers, monomers having a hydroxy group such as 2-hydroxyethyl(meth) acrylate and 3-hydroxypropyl(meth)acrylate, and monomers having an ethylene oxide group such as methoxy(mono, di, tri, polyethylene glycol(meth)acrylate. It should be noted that constituent cations of the salts as the anionic monomers are, for example, lithium, sodium, potassium, ammonium, and organic ammonium ions. The resin to be used in the present invention has an acid value, and hence the hydrophilic unit of the resin includes a unit derived from the anionic monomer as mentioned above. It should be noted that the resin is preferably one having water solubility through neutralization with a neutralizer such as an alkali metal (e.g., lithium, sodium, or potassium) hydroxide or aqueous ammonia.

Examples of a monomer having a hydrophobic group which will become a hydrophobic unit by polymerization include the following: a monomers having an aromatic ring such as styrene, α-methylstyrene, and benzyl(meth)acrylate, and monomers having an aliphatic group such as ethyl(meth) acrylate, methyl(meth)acrylate, (iso)propyl(meth)acrylate, (n-, iso-, or t-)butyl(meth)acrylate, and 2-ethylhexyl(meth) acrylate. Of those, in order that the adsorptivity of the resin to the surface of a pigment particle can be additionally enhanced, it is preferred to use, a resin including, as the hydrophobic unit, a unit derived from styrene as a monomer having a three-dimensionally compact structure and having high hydrophobicity.

The form of the resin to be used in the present invention is not limited, and examples thereof include random, block, and graft forms. In order to enhance the adsorptivity of the resin to the surface of a pigment particle, a block copolymer is advantageous. Further, the weight average molecular weight of the resin to be used in the ink of the present invention is preferably 1,000 or more and 30,000 or less, more preferably 3,000 or more and 15,000 or less, particularly preferably 3,000 or more and 9,000 or less.

Aqueous Medium

In the ink of the present invention, it is preferred to incorporate water or a mixed solvent of water and a water-soluble organic solvent as an aqueous medium. Deionized water or ion exchanged water is preferably used as the water. In particular, the ink of the present invention is preferably an aqueous ink containing at least water as an aqueous medium. The content (mass %) of the water in the ink is preferably 50.0 mass % or more and 95.0 mass % or less with respect to the total mass of the ink. Further, as the water-soluble organic solvent, there may be used, for example, any of conventionally known ones generally used in ink jet inks, and one kind or two or more kinds of water-soluble organic solvents may be used. Specifically, examples of the water-soluble organic solvent include that is liquid at 25° C., such as, monohydric or polyhydric alcohols, alkylene glycols each having about 1 to 4 carbon atoms in an alkylene group, polyethylene glycols each having an average molecular weight of about 200 to 2,000, glycol ethers, and nitrogen-containing compounds. The content (mass %) of the water-soluble organic solvent in the ink is preferably 3.0 mass % or more and 50.0 mass % or less with respect to the total mass of the ink.

In the present invention, the content (mass %) of the water-soluble organic solvent in the ink is preferably 30.0 mass % or less, particularly more preferably 16.5 mass % or less with respect to the total mass of the ink. As a result of studies by the inventors of the present invention, it was found that the generation of an aggregate in an ink flow path can be suppressed at a higher level by controlling the content of the water-soluble organic solvent within the above-mentioned range. When the content of the water-soluble organic solvent is more than 30.0 mass %, not only the resin is adsorbed to the surface of a pigment particle having a surface charge amount within the above-mentioned range but also the water-soluble organic solvent is easily solvated to the surface. As a result, an action of sufficiently dispersing an aggregate by the resin is slightly inhibited. Further, when the content of the water-soluble organic solvent is more than 16.5 mass %, the affinity of the water-soluble organic solvent with the hydrophobic unit of the resin sharply increases. As a result, the adsorptivity of the resin to the surface of a pigment particle becomes relatively low, and an action of sufficiently dispersing an aggregate by the resin is slightly inhibited. On the other hand, the content of the water-soluble organic solvent is preferably 5.0 mass % or more. When the content is less than 5.0 mass %, ink jet characteristics such as adherence resistance may slightly lower.

Further, in the ink of the present invention, among the water-soluble organic solvents mentioned above, it is particularly preferred to incorporate a nitrogen-containing compound such as 2-pyrrolidone or N-methyl-2-pyrrolidone. The nitrogen-containing compound has an action of loosening the association state of the resin in the ink. Hence, among the units constituting the resin, the degree of freedom of the hydrophobic unit becomes high as well, and the adsorptivity of the resin to the surface of a pigment particle can be enhanced. As a result, the deposition of an aggregate can be effectively suppressed.

Permeation Agent

An object of the present invention to improve the color developability of an image to be recorded with an ink containing a self-dispersible monoazo pigment and secure a high level of ejection stability of the ink. In order to enhance the color developability of the image, it is more advantageous that the surface tension of the ink be high. As a reference value, the surface tension is preferably 36 mN/m or more. On the other hand, when the surface tension is too high, the fixability of an image and the like are liable to lower in some cases, and hence the surface tension of the ink is preferably 40 mN/m or less. The surface tension of the ink is preferably adjusted with a substance serving as a permeation agent, specifically, a surfactant or a water-soluble organic solvent such as a 1,2-alkanediol or a glycol ether.

Examples of the surfactant suitable for the ink of the present invention include an anionic surfactant and a nonionic surfactant as described below, and one kind or two or more kinds thereof may be used. Examples of the anionic surfactant include fatty acid salts, higher alcohol sulfuric acid ester salts, liquid fatty oil sulfuric acid ester salts, and alkyl allyl sulfonic acid salts. Examples of the nonionic surfactant include polyoxyethylene alkyl ethers, polyoxyethylene alkyl esters, polyoxyethylene sorbitan alkyl esters, acetylene alcohols, acetylene glycols, and ethylene oxide adducts of acetylene glycols. Of those, in particular, acetylene alcohols, acetylene glycols, and ethylene oxide adducts of acetylene glycols may be suitably used because they exhibit excellent effects of controlling the permeability of an ink into a recording medium such as plain paper. When the surfactant is incorporated into the ink, it is preferred to use a surfactant having an HLB value, which is determined by the Griffin method, of 13.0 or more. The reason for this is as described below. A low HLB value means that the hydrophobicity of the surfactant is high, and such surfactant is easily adsorbed to the surface of a pigment particle. Thus, in the case of using a surfactant which has an HLB value higher than a predetermined value and does not inhibit the adsorption of the resin to the surface of a pigment particle, an action of sufficiently dispersing an aggregate by a resin is not impaired. It should be noted that the HLB value by the Griffin method is determined by 20×(formula weight of hydrophilic group of surfactant/molecular weight of surfactant).

The content (mass %) of the surfactant in the ink, which may vary depending on the content of the resin in the ink, is preferably 0.0 mass % or more and less than 0.40 mass %, particularly preferably 0.0 mass % or more and 0.20 mass % or less with respect to the total mass of the ink. That is, this means that it is not necessary to incorporate the surfactant into the ink as long as a suitable surface tension is imparted to the ink, and in the case of incorporating the surfactant, the content is preferably less than 0.40 mass %, more preferably 0.20 mass % or less.

Meanwhile, the surfactant in the ink can exhibit an action of inhibiting the adsorption of the resin to the surface of a pigment particle as described above. Thus, in the present invention, for adjusting the surface tension of the ink, it is preferred to use an alkanediol, a glycol ether, or the like rather than to use a surfactant. In this case, the 1,2-alkanediol or the glycol ether is known to have an effect of inhibiting the generation of an aggregate as described in Japanese Patent Application Laid-Open No. 2006-225638 and Japanese Patent Application Laid-Open No. 2006-199744 mentioned above as prior art literatures. Thus, the use of any of those compounds can also inhibit the generation of an aggregate. However, in order to achieve the color developability at a level required for the present invention, it is preferred to prevent the surface tension of the ink from becoming too low. Therefore, it is preferred to determine the contents of those compounds so as to satisfy the condition that the surface tension is 36 mN/m or more. Specifically, the content (mass %) of the 1,2-alkanediol, the glycol ether, or the like in the ink is preferably 0.0 mass % or more and less than 1.0 mass % with respect to the total mass of the ink. That is, this means that it is not necessary to incorporate any of those compounds into the ink as long as a suitable surface tension is imparted to the ink, and in the case of incorporating any of those compounds, the content is preferably less than 1.0 mass %.

Other Components

The ink of the present invention may contain an organic compound that is solid at normal temperature such as trimethylolethane, trimethylolpropane, urea, or ethylene urea, in addition to the above-mentioned components as required. Further, in addition to the above-mentioned components, the ink may further contain any of various additives such as a pH adjustor, a defoaming agent, a rust inhibitor, an antiseptic, a mildewproofing agent, an antioxidant, an anti-reducing agent, an evaporation accelerator, and a chelating agent as required.

<Ink Cartridge>

An ink cartridge of the present invention includes an ink and an ink storage portion for storing the ink, and the ink storage portion stores the ink of the present invention described above. The structure of the ink cartridge is, for example, such that the ink storage portion is formed of an ink storage chamber for storing a liquid ink and a negative-pressure-generating member-storing chamber for storing a negative-pressure-generating member for holding the ink therein by a negative pressure. Alternatively, the ink cartridge may be such that the ink storage portion is of such a construction as to have no ink storage chamber for storing a liquid ink and to hold the total amount of the ink to be stored by the negative-pressure-generating member Further, the ink cartridge may be of a shape formed so as to have the ink storage portion and a recording head.

<Ink Jet Recording Method>

An ink jet recording method of the present invention is a method involving ejecting the ink of the present invention described above with a recording head of an ink jet system to record an image on a recording medium. In the present invention, an ink jet recording method involving utilizing, as a system for ejecting an ink, a system in which thermal energy is applied to the ink is adopted. Any step of the ink jet recording method other than the use of the ink of the present invention has only to be a known one.

EXAMPLES

Next, the present invention is described more specifically by way of examples, comparative examples, and reference examples. However, the present invention is not limited by the following examples unless going beyond the gist of the present invention. It should be noted that the terms "part(s)" and "%" in the following description refer to "part(s) by mass" and "mass %," respectively unless otherwise stated. Further, any of various physical properties is a value measured at 25° C.

<Preparation of Water-Soluble Resin>

First, monomers (unit: parts) shown in the upper rows of Table 1 were copolymerized by a conventional method to synthesize water-soluble resins 1 to 9, respectively. Each of the resultant resins was used to prepare each resin aqueous solution as described below. Specifically, all acidic groups in the resins were neutralized with a 10.0% sodium hydroxide aqueous solution, and ion exchanged water was further added to yield resin aqueous solutions 1 to 9 each having a content of a resin (solid content) of 10.0%. The lower rows of Table 1 show characteristics of the resins.

TABLE 1

Compositions and characteristics of resins

| | | Resin 1 | Resin 2 | Resin 3 | Resin 4 | Resin 5 | Resin 6 | Resin 7 | Resin 8 | Resin 9 |
|---|---|---|---|---|---|---|---|---|---|---|
| Monomers used for synthesis | Styrene | 67 | 62 | 60 | 68 | 58 | 62 | 58 | 62 | |
| | α-Methylstyrene | | | | | | | | | 62 |
| | Benzyl methacrylate | | | | | | 20 | | | |
| | Butyl acrylate | 20 | 20 | 20 | 20 | 20 | | 20 | 20 | 20 |
| | Acrylic acid | 13 | 18 | 20 | 12 | 22 | 18 | | 18 | 18 |
| | Methacrylic acid | | | | | | | 22 | | |
| Characteristics | Acid value [mgKOH/g] | 100 | 140 | 160 | 90 | 170 | 140 | 140 | 140 | 140 |
| | Weight average molecular weight | 9,000 | 9,000 | 9,000 | 9,000 | 9,000 | 9,000 | 9,000 | 9,000 | 9,000 |
| | Form | Random | Random | Random | Random | Random | Random | Random | Block | Random |

<Preparation of Pigment Dispersion Liquid>

Surface Charge Amount of Monoazo Pigment

First, a method of measuring the surface charge amount of a monoazo pigment is described. The surface charge amount of a self-dispersible pigment in a pigment dispersion liquid was measured by potential difference titration with an automatic potentiometric titrator AT-510 (manufactured by Kyoto Electronics Manufacturing Co., Ltd.) equipped with a streaming potential titration unit (PCD-500) using methyl glycol chitosan as a titration reagent.

Pigment Dispersion Liquid 1

To a solution prepared by dissolving 5 g of concentrated hydrochloric acid in 5.5 g of water was added 1.0 g of p-aminobenzoic acid while the solution was cooled to 5° C. Next, a vessel containing the solution was placed in an ice bath, and the temperature of the solution was constantly kept at 10° C. or less by stirring the solution. To the solution was added a solution prepared by dissolving 1.2 g of sodium nitrite in 9 g of water at 5° C. The resultant solution was stirred for an additional 15 minutes. Then, 6 g of C.I. Pigment Yellow 74 (monoazo pigment) having a specific surface area of 65.5 $m^2/g$ was added to the stirred solution. After that, the mixture was stirred for an additional 15 minutes. The resultant slurry was filtered with filter paper (standard filter paper No. 2; manufactured by Advantec Co.). Then, the resultant particles were washed sufficiently with water and dried in an oven at 110° C. to prepare a pigment 1 having a —$C_6H_3$—$(COONa)_2$ group bonded to the surface of a pigment particle. A pigment dispersion liquid 1 was prepared by adding water to the resultant pigment 1 and dispersing the pigment so as to achieve a pigment content of 10.0%. The surface charge amount of the pigment 1 in the pigment dispersion liquid 1 was $5.9\times10^{-2}$ mmol/g.

Pigment Dispersion Liquids 2, 3, 6, and 7

Pigment dispersion liquids 2, 3, 6, and 7 having respective contents of pigments 2, 3, 6, and 7 of 10.0% were prepared according to the same procedure as that in the pigment dispersion liquid 1 except that the amounts of p-aminobenzoic acid and sodium nitrite used were changed. The surface charge quantities of the pigments in the respective pigment dispersion liquids were as follows: $7.9\times10^{-2}$ mmol/g for the pigment 2; $9.8\times10^{-2}$ mmol/g for the pigment 3; $5.2\times10^{-2}$ mmol/g for the pigment 6; and $10.5\times10^{-2}$ mmol/g for the pigment 7.

Pigment Dispersion Liquid 4

A pigment dispersion liquid 4 having a pigment content of 10.0% was prepared according to the same procedure as that in the pigment dispersion liquid 1 except that C.I. Pigment Yellow 74 was changed to C.I. Pigment Yellow 1 (monoazo pigment). The surface charge amount of a pigment 4 in the pigment dispersion liquid 4 was $7.9\times10^{-2}$ mmol/g.

Pigment Dispersion Liquid 5

A pigment dispersion liquid 5 having a pigment content of 10.0% was prepared according to the same procedure as that in the pigment dispersion liquid 1 except that C.I. Pigment Yellow 74 was changed to C.I. Pigment Red 269 (monoazo pigment). The surface charge amount of a pigment 5 in the pigment dispersion liquid 5 was $7.9\times10^{-2}$ mmol/g.

Pigment Dispersion Liquid 8

Referring to the description of Japanese Patent Application Laid-Open No. 2006-199744, a resin-bonded self-dispersible pigment was prepared by the following method. 500 g of C.I. Pigment Yellow 74 (monoazo pigment), 45 g of aminophenyl (2-sulfoethyl)sulfone (APSES), and 900 g of distilled water were loaded into a reactor. Then, the mixture was stirred at 55° C. at a rotation number of 300 rpm for 20 minutes. To the mixture was added 40 g of a 25% sodium nitrite aqueous solution over 15 minutes and was further added 50 g of distilled water. Then, the resultant mixture was subjected to a reaction at 60° C. for 2 hours. The reaction product was taken out while being diluted with distilled water and adjusted so that the solid content was 15.0%. After that, the removal of impurities by centrifugation yielded a dispersion liquid A. The dispersion liquid A contained a pigment to which APSES was bonded.

Next, the following operation was carried out in order to determine the amount (moles) of the group bonded to the pigment in the dispersion liquid A. The concentration of sodium ions in the dispersion liquid was measured with a sodium ion electrode (1512A-10C; manufactured by HORIBA, Ltd.) and converted into moles per solid content of the pigment. Next, the dispersion liquid A having a solid content of 15.0% was added dropwise over 1 hour to a pentaethylenehexamine (PEHA) solution at room temperature while being stirred vigorously. In this case, the concentration of PEHA in the PEHA solution was 2 to 3 times the moles of sodium ions measured above, and the amount of the solution was the same amount as that of the dispersion liquid A. The mixture was stirred for 48 hours. Then, the removal of impurities yielded a dispersion liquid B. The dispersion liquid B contained a pigment in which PEHA was bonded via APSES to a particle surface, and had a solid content of 10.0%.

To an aqueous solution having dissolved therein a styrene-acrylic acid copolymer (weight average molecular weight: 9,000, acid value: 140 mg KOH/g, molecular weight distribution Mw/Mn: 1.5) as a water-soluble resin was added dropwise 500 g of the dispersion liquid B having a solid content of 10.0% obtained above while being stirred. The aqueous solution used in this case was prepared by adding 1,800 g of distilled water to 95 g of the styrene-acrylic acid copolymer, adding sodium hydroxide necessary for neutralizing the resin, and dissolving the contents by stirring. Then, the above-mentioned mixture was transferred to a Pyrex (registered trademark) evaporating dish and heated at 150° C. for 15 hours to evaporate the liquid components, and the dried product was then cooled to room temperature. Next, the dried product was added to distilled water whose pH was adjusted to 9.0 with sodium hydroxide and dispersed with a disperser. To the stirred dispersion liquid was further added a 1.0 mol/L sodium hydroxide aqueous solution to adjust the pH of the liquid to 10 to 11. After that, a pigment dispersion liquid 8 having a pigment content of 10.0% and a resin content of 2.0% was prepared by performing desalting, removing impurities and large coarse particles, and removing the resin not bonded to the pigment by a centrifugation treatment. The weight average particle size of a pigment 8 in the pigment dispersion liquid 8 was 130 nm, and the pH of the pigment dispersion liquid 8 was 10.1. It should be noted that the pigment 8 is a pigment dispersed with the resin bonded to a particle surface and is not a self-dispersible pigment.

Pigment Dispersion Liquid 9

10.0 parts of C.I. Pigment Yellow 74 (monoazo pigment) having a specific surface area of 65.5 $m^2/g$, 20.0 parts of a 10.0% aqueous solution of the resin 3 (solid content) neutralized with potassium hydroxide equivalent to the acid value, and 50.0 parts of ion exchanged water were mixed with each other. Next, the mixture was loaded into a batch type vertical sand mill (manufactured by AIMEX CO, Ltd.), and 150 parts of zirconia beads each having a diameter of 0.3 mm were charged. The mixture was dispersed for 12 hours while being cooled with water. After that, a pigment dispersion liquid 9 was prepared by removing large coarse particles by a centrifugation treatment, and then adding water to disperse the mixture so as to achieve a pigment content of 10.0% and a resin content of 2.0%. The weight average particle size of a pigment 9 in the pigment dispersion liquid 9 was 120 nm. It should be noted that the pigment 9 is a pigment dispersed with the resin adsorbed to the surface of a pigment particle and is not a self-dispersible pigment.

Pigment Dispersion Liquid 10

A pigment dispersion liquid 10 having a pigment content of 10.0% was prepared by the same procedure as that in the pigment dispersion liquid 9 except that C.I. Pigment Yellow 74 was changed to C.I. Pigment Yellow 1 (monoazo pigment). The weight average particle size of a pigment 10 in the pigment dispersion liquid 10 was 130 nm. It should be noted that the pigment 10 is a pigment dispersed with the resin adsorbed to the surface of a pigment particle and is not a self-dispersible pigment.

Pigment Dispersion Liquid 11

A pigment dispersion liquid 11 having a pigment content of 10.0% was prepared by the same procedure as that in the pigment dispersion liquid 9 except that C.I. Pigment Yellow 74 was changed to C.I. Pigment Red 269 (monoazo pigment). The weight average particle size of a pigment 11 in the pigment dispersion liquid 11 was 120 nm. It should be noted that the pigment 11 is a pigment dispersed with the resin adsorbed to the surface of a pigment particle and is not a self-dispersible pigment.

Pigment Dispersion Liquid 12

A commercially available pigment dispersion (Cab-O-Jet270Y; manufactured by Cabot Corporation) containing self-dispersible C.I. Pigment Yellow 74 (monoazo pigment) dispersed with a sulfonic acid group was used as a pigment dispersion liquid 12. The content of a pigment in the pigment dispersion liquid 12 was 10.0%, and the surface charge amount of the pigment 12 was $13.1\times10^{-2}$ mmol/g.

<Preparation of Ink>

The respective components (unit: %) shown in the upper rows of Table 2 were mixed and sufficiently stirred. After that, the mixture was filtered with a microfilter having a pore size of 1.0 μm (manufactured by FUJIFILM Corporation) under pressure. Thus, each ink of Examples, Comparative Examples, and Reference Examples was prepared. An Acetylenol E100 is a surfactant manufactured by Kawaken Fine Chemicals Co., Ltd., and has an HLB value based on the Griffin method of 13.3. The lower rows of Table 2 show the surface tension [mN/m] measured by a platinum plate method using an automatic surface tension meter (CBVP-Z type; manufactured by KYOWA INTERFACE SCIENCE CO., LTD.), resin content [%], pigment content [%], and value [times] of the resin content to the pigment content of each of the inks as well.

TABLE 2

Compositions of inks

| | Examples | | | | | | | | |
|---|---|---|---|---|---|---|---|---|---|
| | 1 | 2 | 3 | 4 | 5 | 6 | 7 | 8 | 9 |
| Pigment dispersion liquid 1 | | | | | | | 40.0 | | |
| Pigment dispersion liquid 2 | 40.0 | | | 40.0 | 40.0 | 40.0 | | | 40.0 |
| Pigment dispersion liquid 3 | | | | | | | | 40.0 | |
| Pigment dispersion liquid 4 | | 40.0 | | | | | | | |
| Pigment dispersion liquid 5 | | | 40.0 | | | | | | |
| Pigment dispersion liquid 6 | | | | | | | | | |
| Pigment dispersion liquid 7 | | | | | | | | | |
| Pigment dispersion liquid 8 | | | | | | | | | |
| Pigment dispersion liquid 9 | | | | | | | | | |
| Pigment dispersion liquid 10 | | | | | | | | | |
| Pigment dispersion liquid 11 | | | | | | | | | |
| Pigment dispersion liquid 12 | | | | | | | | | |
| Resin aqueous solution 1 | | | | | | | | | 8.0 |
| Resin aqueous solution 2 | 8.0 | 8.0 | 8.0 | | | | 8.0 | 8.0 | |
| Resin aqueous solution 3 | | | | | | | | | |
| Resin aqueous solution 4 | | | | | | | | | |
| Resin aqueous solution 5 | | | | | | | | | |
| Resin aqueous solution 6 | | | | 8.0 | | | | | |
| Resin aqueous solution 7 | | | | | 8.0 | | | | |
| Resin aqueous solution 8 | | | | | | 8.0 | | | |
| Resin aqueous solution 9 | | | | | | | | | |
| Glycerin | 9.0 | 9.0 | 9.0 | 9.0 | 9.0 | 9.0 | 9.0 | 9.0 | 9.0 |
| Diethylene glycol | 3.0 | 3.0 | 3.0 | 3.0 | 3.0 | 3.0 | 3.0 | 3.0 | 3.0 |
| 1,2-Hexanediol | | | | | | | | | |
| 2-Pyrrolidone | 3.0 | 3.0 | 3.0 | 3.0 | 3.0 | 3.0 | 3.0 | 3.0 | 3.0 |
| Acetylenol E100 | 0.39 | 0.39 | 0.39 | 0.39 | 0.39 | 0.39 | 0.39 | 0.39 | 0.39 |
| Water | 36.61 | 36.61 | 36.61 | 36.61 | 36.61 | 36.61 | 36.61 | 36.61 | 36.61 |
| Surface tension of ink [mN/m] | 36 | 36 | 36 | 36 | 36 | 36 | 36 | 36 | 36 |
| Content of water-soluble organic solvent [%] | 15.0 | 15.0 | 15.0 | 15.0 | 15.0 | 15.0 | 15.0 | 15.0 | 15.0 |
| Content of resin [%] | 0.8 | 0.8 | 0.8 | 0.8 | 0.8 | 0.8 | 0.8 | 0.8 | 0.8 |
| Content of pigment [%] | 4.0 | 4.0 | 4.0 | 4.0 | 4.0 | 4.0 | 4.0 | 4.0 | 4.0 |
| Mass ratio of resin to pigment [times] | 0.20 | 0.20 | 0.20 | 0.20 | 0.20 | 0.20 | 0.20 | 0.20 | 0.20 |

| | Examples | | | | | | | | |
|---|---|---|---|---|---|---|---|---|---|
| | 10 | 11 | 12 | 13 | 14 | 15 | 16 | 17 | 18 |
| Pigment dispersion liquid 1 | | | | | | | | | |
| Pigment dispersion liquid 2 | 40.0 | 40.0 | 40.0 | 40.0 | 40.0 | 40.0 | 40.0 | 40.0 | 40.0 |
| Pigment dispersion liquid 3 | | | | | | | | | |
| Pigment dispersion liquid 4 | | | | | | | | | |
| Pigment dispersion liquid 5 | | | | | | | | | |

TABLE 2-continued

Compositions of inks

| | | | | | | | | | |
|---|---|---|---|---|---|---|---|---|---|
| Pigment dispersion liquid 6 | | | | | | | | | |
| Pigment dispersion liquid 7 | | | | | | | | | |
| Pigment dispersion liquid 8 | | | | | | | | | |
| Pigment dispersion liquid 9 | | | | | | | | | |
| Pigment dispersion liquid 10 | | | | | | | | | |
| Pigment dispersion liquid 11 | | | | | | | | | |
| Pigment dispersion liquid 12 | | | | | | | | | |
| Resin aqueous solution 1 | | | | | | | | | |
| Resin aqueous solution 2 | | 2.0 | 10.0 | 8.0 | 8.0 | 8.0 | 8.0 | | 8.0 |
| Resin aqueous solution 3 | 8.0 | | | | | | | | |
| Resin aqueous solution 4 | | | | | | | | | |
| Resin aqueous solution 5 | | | | | | | | | |
| Resin aqueous solution 6 | | | | | | | | | |
| Resin aqueous solution 7 | | | | | | | | | |
| Resin aqueous solution 8 | | | | | | | | | |
| Resin aqueous solution 9 | | | | | | | | 8.0 | |
| Glycerin | 9.0 | 9.0 | 9.0 | 9.0 | 9.0 | 15.0 | 15.0 | 9.0 | 15.0 |
| Diethylene glycol | 3.0 | 3.0 | 3.0 | 4.5 | 6.0 | 13.0 | 12.0 | 3.0 | 13.0 |
| 1,2-Hexanediol | | | | | | | | | |
| 2-Pyrrolidone | 3.0 | 3.0 | 3.0 | 3.0 | | 3.0 | 3.0 | 3.0 | 3.0 |
| Acetylenol E100 | 0.39 | 0.39 | 0.39 | 0.39 | 0.39 | 0.39 | 0.39 | 0.39 | 0.39 |
| Water | 36.61 | 42.61 | 34.61 | 35.11 | 36.61 | 20.61 | 21.61 | 36.61 | 20.61 |
| Surface tension of ink [mN/m] | 36 | 36 | 38 | 36 | 36 | 36 | 36 | 36 | 36 |
| Content of water-soluble organic solvent [%] | 15.0 | 15.0 | 15.0 | 16.5 | 15.0 | 31.0 | 30.0 | 15.0 | 31.0 |
| Content of resin [%] | 0.8 | 0.2 | 1.0 | 0.8 | 0.8 | 0.8 | 0.8 | 0.8 | 0.8 |
| Content of pigment [%] | 4.0 | 4.0 | 4.0 | 4.0 | 4.0 | 4.0 | 4.0 | 4.0 | 4.0 |
| Mass ratio of resin to pigment [times] | 0.20 | 0.05 | 0.25 | 0.20 | 0.20 | 0.20 | 0.20 | 0.20 | 0.20 |

| | Comparative Examples | | | | | | | | |
|---|---|---|---|---|---|---|---|---|---|
| | 1 | 2 | 3 | 4 | 5 | 6 | 7 | 8 | 9 |
| Pigment dispersion liquid 1 | | | | | | | | | |
| Pigment dispersion liquid 2 | | 40.0 | | | | 40.0 | 40.0 | 40.0 | 40.0 |
| Pigment dispersion liquid 3 | | | | | | | | | |
| Pigment dispersion liquid 4 | | | | | | | | | |
| Pigment dispersion liquid 5 | | | | | | | | | |
| Pigment dispersion liquid 6 | | | 40.0 | | | | | | |
| Pigment dispersion liquid 7 | | | | 40.0 | | | | | |
| Pigment dispersion liquid 8 | 40.0 | | | | | | | | |
| Pigment dispersion liquid 9 | | | | | | | | | |
| Pigment dispersion liquid 10 | | | | | | | | | |
| Pigment dispersion liquid 11 | | | | | | | | | |
| Pigment dispersion liquid 12 | | | | | 40.0 | | | | |
| Resin aqueous solution 1 | | | | | | | | | |
| Resin aqueous solution 2 | | | 8.0 | 8.0 | 8.0 | | | 1.6 | 11.0 |
| Resin aqueous solution 3 | | | | | | | | | |
| Resin aqueous solution 4 | | | | | | 8.0 | | | |
| Resin aqueous solution 5 | | | | | | | 8.0 | | |
| Resin aqueous solution 6 | | | | | | | | | |
| Resin aqueous solution 7 | | | | | | | | | |
| Resin aqueous solution 8 | | | | | | | | | |
| Resin aqueous solution 9 | | | | | | | | | |
| Glycerin | 9.0 | 9.0 | 9.0 | 9.0 | 9.0 | 9.0 | 9.0 | 9.0 | 9.0 |
| Diethylene glycol | 3.0 | 3.0 | 3.0 | 3.0 | 3.0 | 3.0 | 3.0 | 3.0 | 3.0 |
| 1,2-Hexanediol | | | | | | | | | |
| 2-Pyrrolidone | 3.0 | 3.0 | 3.0 | 3.0 | 3.0 | 3.0 | 3.0 | 3.0 | 3.0 |
| Acetylenol E100 | 0.39 | 0.39 | 0.39 | 0.39 | 0.39 | 0.39 | 0.39 | 0.39 | 0.39 |
| Water | 44.61 | 44.61 | 36.61 | 36.61 | 36.61 | 36.61 | 36.61 | 43.01 | 33.61 |
| Surface tension of ink [mN/m] | 38 | 36 | 36 | 36 | 36 | 36 | 36 | 36 | 38 |
| Content of water-soluble organic solvent [%] | 15.0 | 15.0 | 15.0 | 15.0 | 15.0 | 15.0 | 15.0 | 15.0 | 15.0 |
| Content of resin [%] | 0.8 | 0.0 | 0.8 | 0.8 | 0.8 | 0.8 | 0.8 | 0.2 | 1.1 |
| Content of pigment [%] | 4.0 | 4.0 | 4.0 | 4.0 | 4.0 | 4.0 | 4.0 | 4.0 | 4.0 |
| Mass ratio of resin to pigment [times] | 0.20 | 0.00 | 0.20 | 0.20 | 0.20 | 0.20 | 0.20 | 0.04 | 0.28 |

| | Reference Examples | | | |
|---|---|---|---|---|
| | 1 | 2 | 3 | 4 |
| Pigment dispersion liquid 1 | | | | |
| Pigment dispersion liquid 2 | | | | 40.0 |
| Pigment dispersion liquid 3 | | | | |
| Pigment dispersion liquid 4 | | | | |
| Pigment dispersion liquid 5 | | | | |

TABLE 2-continued

| Compositions of inks | | | | |
|---|---|---|---|---|
| Pigment dispersion liquid 6 | | | | |
| Pigment dispersion liquid 7 | | | | |
| Pigment dispersion liquid 8 | | | | |
| Pigment dispersion liquid 9 | 40.0 | | | |
| Pigment dispersion liquid 10 | | 40.0 | | |
| Pigment dispersion liquid 11 | | | 40.0 | |
| Pigment dispersion liquid 12 | | | | |
| Resin aqueous solution 1 | | | | |
| Resin aqueous solution 2 | | | | |
| Resin aqueous solution 3 | | | | |
| Resin aqueous solution 4 | | | | |
| Resin aqueous solution 5 | | | | |
| Resin aqueous solution 6 | | | | |
| Resin aqueous solution 7 | | | | |
| Resin aqueous solution 8 | | | | |
| Resin aqueous solution 9 | | | | |
| Glycerin | 9.0 | 9.0 | 9.0 | 9.0 |
| Diethylene glycol | 3.0 | 3.0 | 3.0 | 2.0 |
| 1,2-Hexanediol | | | | 1.0 |
| 2-Pyrrolidone | 3.0 | 3.0 | 3.0 | 3.0 |
| Acetylenol E100 | 0.39 | 0.39 | 0.39 | 0.39 |
| Water | 44.61 | 44.61 | 44.61 | 44.61 |
| Surface tension of ink [mN/m] | 38 | 38 | 38 | 35 |
| Content of water-soluble organic solvent [%] | 15.0 | 15.0 | 15.0 | 15.0 |
| Content of resin [%] | 0.8 | 0.8 | 0.8 | 0.0 |
| Content of pigment [%] | 4.0 | 4.0 | 4.0 | 4.0 |
| Mass ratio of resin to pigment [times] | 0.20 | 0.20 | 0.20 | 0.00 |

<Evaluation>

An ink cartridge filled with each of the inks obtained above was mounted on an ink jet recording apparatus (trade name: PIXUS Pro 9500; manufactured by Canon Inc.) equipped with a recording head from which the ink was ejected by an action of thermal energy. The recording apparatus had a resolution of 600 dpi×600 dpi, and a solid image used for each evaluation was recorded under such a condition that six ink droplets were applied onto a unit region measuring 1/600 inch by 1/600 inch in an amount of 3.5 pL per drop. The setting of a printer driver in this case was as follows: paper type: plain paper; printing quality: standard; and color adjustment: automatic. Plain paper PB PAPER GF-500 (manufactured by Canon Inc.) was used as a recording medium.

Evaluation of Color Developability

A solid image measuring 5 cm by 5 cm was recorded with each of the inks under the above-mentioned condition. The resultant image was dried at a temperature of 23° C. and a relative humidity of 55% for 24 hours. Then, the optical density of the solid image was measured with a spectrophotometer (trade name: Spectrolino; manufactured by Gretag Macbeth Co.) under the condition of light source: D50 and visual field: 2° to evaluate the color developability of the image. The evaluation criteria for the color developability are as described below. Table 3 shows the evaluation results. In the present invention, an acceptable level was expressed as Symbol "A" and an unacceptable level was expressed as Symbol "B" or "C" in the following evaluation criteria.

A: The optical density was higher than a reference value by 0.05 or more.

B: The optical density was higher than the reference value, but the difference from the reference value was less than 0.05.

C: The optical density was equal to or lower than the reference value (image obtained with an ink according to Reference Example containing the same kind of pigment).

Evaluation of Ejection Stability

Under the above-mentioned condition, 300 solid images measuring 19 cm by 26 cm were recorded on A4-sized recording media. After that, the recording head was taken out from the ink jet recording apparatus, and the inside of an ink flow path was observed with a light microscope. The ejection stability is reduced by a deposit generated in the ink flow path, and hence the ejection stability was evaluated based on the status of the generated precipitate. The evaluation criteria for the ejection stability are as described below. Table 3 shows the evaluation results. In the present invention, an acceptable level was expressed by Symbol "A" or "B" and an unacceptable level was expressed by Symbol "C" in the following evaluation criteria.

A: Almost no deposit was generated.

B: A deposit was slightly generated.

C: A deposit was generated throughout the entire ink flow path.

TABLE 3

| Evaluation results | | | |
|---|---|---|---|
| | | Color developability | Ejection stability |
| Examples | 1 | A | A |
| | 2 | A | A |
| | 3 | A | A |
| | 4 | A | A |
| | 5 | A | A |
| | 6 | A | A*1 |
| | 7 | A | A |
| | 8 | A | A |
| | 9 | A | A |
| | 10 | A | A |
| | 11 | A | A |
| | 12 | A | A |
| | 13 | A | A |
| | 14 | A | B |
| | 15 | A | A*2 |
| | 16 | A | A*3 |
| | 17 | A | A*4 |
| | 18 | A | B*5 |

TABLE 3-continued

| Evaluation results | | | |
|---|---|---|---|
| | | Color developability | Ejection stability |
| Comparative Examples | 1 | C | A |
| | 2 | A | C |
| | 3 | A | C |
| | 4 | A | C |
| | 5 | A | C |
| | 6 | A | C |
| | 7 | A | C |
| | 8 | A | C |
| | 9 | B | B |
| Reference Examples | 1 | C | C |
| | 2 | C | C |
| | 3 | C | C |
| | 4 | C | B |

Notes about evaluation results of ejection stability

*[1]Example 6 had an aggregate in a smaller amount than Example 1 and was relatively good in ejection stability.

*[2]Example 15 had an aggregate in a larger amount than Example 16 and was relatively poor in ejection stability.

*[3]Example 16 had an aggregate in a larger amount than Example 1 and was relatively poor in ejection stability.

*[4]Example 17 had an aggregate in a larger amount than Example 1 and was relatively poor in ejection stability.

*[5]Example 18 had an aggregate in a larger amount than Example 14 and was relatively poor in ejection stability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-093359, filed Apr. 19, 2011, and No. 2012-079591, filed Mar. 30, 2012, which are hereby incorporated by reference herein in their entirety.

What is claimed is:

1. An ink jet ink, being used for an ink jet recording system in which the ink is ejected from a recording head by an action of thermal energy, comprising a monoazo pigment and a resin, wherein:

the monoazo pigment comprises a self-dispersible pigment having an anionic group bonded to a particle surface of the pigment directly or via another atomic group and has a surface charge amount of $5.9\times10^{-2}$ mmol/g or more and $9.8\times10^{-2}$ mmol/g or less;

the resin has an acid value of 100 mg KOH/g or more and 160 mg KOH/g or less; and a mass ratio of a content (mass %) of the resin to a content (mass %) of the monoazo pigment in the ink is 0.05 times or more and 0.25 times or less.

2. An ink according to claim 1, wherein the ink further comprises a water-soluble organic solvent, and the water-soluble organic solvent comprises a nitrogen-containing compound.

3. An ink according to claim 2, wherein a content (mass %) of the water-soluble organic solvent in the ink is 30.0 mass % or less with respect to a total mass of the ink.

4. An ink according to claim 2, wherein a content (mass %) of the water-soluble organic solvent in the ink is 16.5 mass % or less with respect to a total mass of the ink.

5. An ink according to claim 1, wherein the resin has a hydrophilic unit and a hydrophobic unit, and the hydrophobic unit comprises a unit derived from styrene.

6. An ink cartridge, comprising an ink and an ink storage portion storing the ink, wherein the ink comprises the ink according to claim 1.

7. An ink jet recording method, comprising ejecting an ink from a recording head of an ink jet system by an action of thermal energy to record an image on a recording medium, wherein the ink comprises the ink according to claim 1.

* * * * *